June 25, 1940.  E. W. DAVIS  2,205,759
LUBRICATING APPARATUS
Filed Aug. 27, 1937
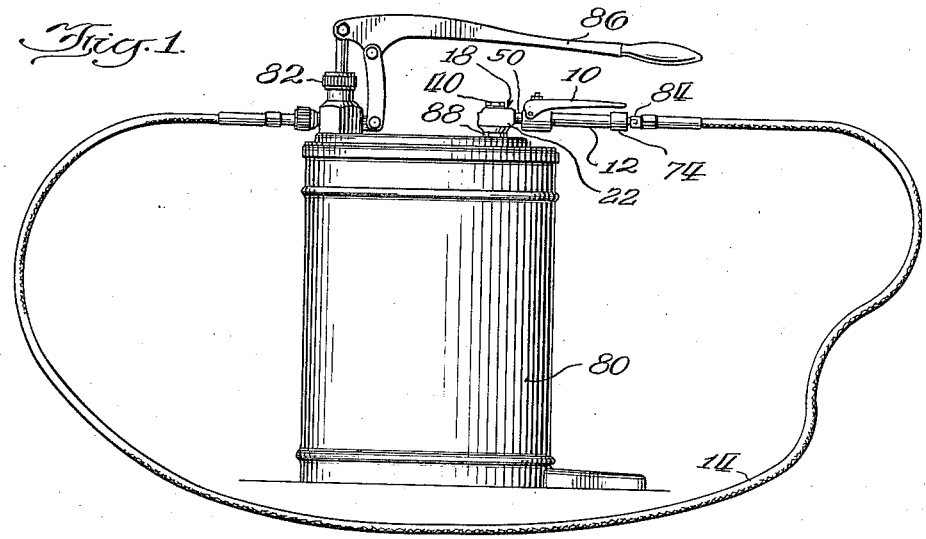
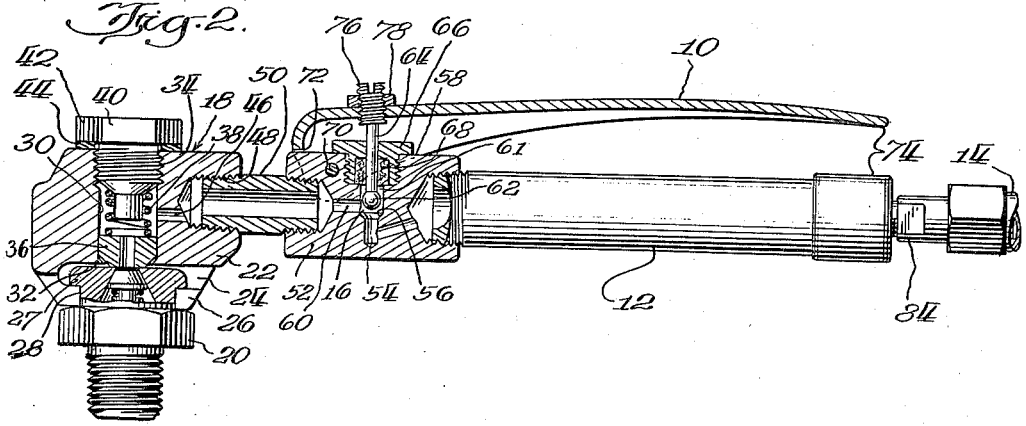
Inventor.
Ernest W. Davis
By
Williams, Bradbury, McCaleb & Hinkle
Attys.

Patented June 25, 1940

2,205,759

UNITED STATES PATENT OFFICE 2,205,759

LUBRICATING APPARATUS

Ernest W. Davis, Oak Park, Ill., assignor to Stewart-Warner Corporation, Chicago, Ill., a corporation of Virginia Application August 27, 1937, Serial No. 161,180

5 Claims. (Cl. 221—47.1)

My invention relates to lubricating apparatus, and more particularly to an improved high pressure lubricating system by means of which lubricating operations may be performed with greater facility and rapidity than heretofore.

In the past, hand operated lubricating systems employed a hand operated lubricant compressor mounted on a portable or semi-portable lubricant reservoir, and the compressor was successively connected to the lubricant receiving fittings on the parts to be lubricated by means of a coupler at the end of the discharge hose of the compressor. The flow of lubricant from the compressor to the fitting was controlled by a manually opened and spring or lubricant pressure closed valve. Flow of lubricant took place only while the valve was manually held open. Generally speaking, it is essential that the control valve be located near the discharge end of the discharge hose, (which is usually a flexible conduit), to prevent the lubricant in the conduit from flowing or oozing from the coupler after the latter is disconnected from the fitting. This is necessary due to the entrainment of small amounts of air in the lubricant and due to the fact that the flexible conduit itself is slightly expansible. If the compressor is supplying a part offering appreciable resistance to the inflow of lubricant, and the coupler disconnected, without closing a valve adjacent the coupler, the air mixed with the lubricant would expand, and the conduit itself contract, and thus lubricant would be forced from the open end of the disconnected coupling. In these prior lubricating systems, it was therefore customary to provide a valve which was held open with one hand while the operator actuated the compressor with the other hand. In many instances, due to the location of the fitting at a relatively inaccessible point, it was difficult or impossible for the operator simultaneously to perform both of these operations, and it was therefore frequently necessary to employ a helper to actuate the compressor while the operator successively attached the coupler to the lubricant receiving fittings and operated the control valve.

Furthermore, in the lubrication of a machine by means of the hand operated high pressure lubricating systems heretofore used, it was necessary for the operator to hold the control valve open for extended periods of time while the lubricant was being supplied to the parts to be lubricated. This was a tiring operation. During the operation of connecting the coupler to a fitting and disconnecting it therefrom, it was necessary for the operator frequently to exert considerable force upon the control valve, and in doing so, the lever or trigger for opening the valve was often inadvertently operated, resulting in undesired discharge of lubricant from the coupler. Similarly, in moving the control valve about during a lubricating operation, the valve operating lever or trigger was frequently inadvertently operated by coming in contact with parts of the machine. Thus during the intervals when it was essential that the operator maintain a firm grip upon the control valve, it was necessary for him to be careful not to grip the valve tight enough to cause the valve to open. Consequently, the operator resorted to the expedient of changing grips, or of using a heavy compression spring to prevent inadvertent depressing of the manual control. With the changing of grips, time was wasted and the coupler was dropped frequently with resulting breakage of parts, and when a heavy spring was being used, the operation became more fatiguing.

One of the prime requisites of any high pressure lubricating system is that it be easily and speedily operated. As above pointed out, the systems heretofore employed did not fully meet this requirement, and in addition resulted in the excessive fatigue of the operator and unnecessary waste of lubricant.

It is therefore one of the objects of my invention to provide an improved high pressure lubricating system by which lubricant may be conveniently and rapidly supplied to a plurality of bearings without wasting lubricant or excessively tiring the operator.

Another object of the invention is to provide a lubricating system which an operator who is not familiar with its structural characteristics will naturally operate in the correct manner without instruction.

Another object of the invention is to provide an improved lubricating system and control therefor which is adapted to the manual forces naturally employed in the steps and operations involved in the lubrication of a machine.

Another object of the invention is to provide an improved control device for high pressure lubricant supply conduits in which the necessity for care in connecting the conduit to a lubricant receiving fitting and disconnecting it therefrom, (in order to prevent inadvertent operation of the control device), is substantially eliminated.

Another object of the invention is to provide constructions affording an improved method of operating and controlling a high pressure lubricating system.

Another object of the invention is to provide a lubricating system which is simple in construction and operation, thoroughly effective in its use, and inexpensive to manufacture and maintain.

These being among the objects of the invention, other and further objects will become apparent from the drawing herein, the description relating thereto, and the appended claims.

Fig. 1 is a side elevation of a preferred embodiment illustrating the invention; and Fig. 2 is a sectional view of a portion of said system shown in Fig. 1.

Referring now to the drawing in further detail, the embodiment of the invention illustrated will be better understood when it is recognized that it is desirable for an operator to devote his attention alternately between a lubricant compressor and a manually controlled means for making a connection with and supplying lubricant to a fitting. The connection should be capable of being maintained in a way not only permitting the proper flow of lubricant to the fittings, but also freeing the hands of the operator so that he may operate the pump to create the desired flow of lubricant.

Not only this, but with the flow controlled by a valve, the natural tendency of an operator is to grip the handle of a valve control device tightly while it is being manipulated. Corollary to this, the natural tendency is to release the grip when proper engagement has been accomplished. The invention capitalizes upon these natural tendencies.

Referring to Fig. 2, the valve used to control the flow of lubricant from the lubricant compressor to the lubricant receiving fitting comprises a pipe handle 12, which may be swiveled to a discharge hose 14, and a valve 16, which is operated by means of a handle 10, and thus controls the flow of lubricant to a coupler designated generally 18, which may be coupled to a lubricant receiving fitting 20. It will be understood that a plurality of lubricant receiving fittings 20 are secured respectively to the various parts of the machine requiring lubrication and that the coupler 18 is successively connected to these fittings during the lubricating operation.

The coupler 18 comprises a body 22 having a slot 24 therein for receiving the head 27 of the fitting, and a narrower open end slot 26 for engaging around the neck 28 of the fitting. The body 22 is provided with a bore 30 terminating at one end in a beveled shoulder 32 and threaded at its opposite end as indicated at 34 to receive a plug 40, the head 42 of which seals against a gasket 44. A helical coil spring 38 is compressed between the plug 40 and an apertured slidable sealing member 36, the lower end of which is beveled complementally to the shoulder 32 and is adapted to be pressed against the top face of the fitting 20 to make a lubricant-tight sealed connection therewith. During the operation of supplying lubricant to the fitting, the force of the spring 38 is supplemented by the pressure of the lubricant acting upon the upper surface of the sealing member 36 to force the latter into firm engagement with the head 27 of the fitting. Lubricant is supplied to the bore 30 through a passageway 46 drilled in the body 22 which communicates with a threaded bore 48, to which a connecting nipple 50 is screwed, the other end of the nipple being threaded into the valve body 52.

The valve body is provided with connecting passageways 54 and 60, a valve seat 56 being located between these passageways for cooperation with the spherical head 62 carried by a valve stem 64. The valve 62, in cooperation with its seat 56, is thus adapted to control flow of lubricant from the hollow handle 12 to the coupler 22. The spherical valve head 62 is carried by a stem 64 which is guided for reciprocatory movement in a packing gland 66 which also serves to hold packing 68 tightly about the valve stem 64. The handle 10 is pivoted upon a pin 70 which extends through the valve body 52 and has a shoulder 72 adapted to abut against the valve body 52 to limit movement of the handle 10 in a direction away from the complementary pipe handle 12. The valve handle 10 is provided with an adjusting screw 76 held in adjusted position by a lock nut 78 and having its flat end engaging with the outer extremity of the valve stem 64.

The high pressure lubricant compressor may be of any suitable construction, and is illustrated in Fig. 1 as comprising a lubricant container or reservoir 80 having a pump 82 secured thereto, the pump being manually operated by means of a handle 86. The outlet of the compressor or pump 86 is connected to the conduit 14, which may, if desired, be provided with a detachable coupling connection 84. The lubricant reservoir 80 is provided with a fitting 88 which may be identical with the fitting 20, preferably with its inlet valve omitted.

In operating the improved lubricating system, the operator will first attach the coupler 22 to a lubricant receiving fitting and then operate the handle 86 until sufficient lubricant has been supplied to the part to which the fitting 20 is connected. Then, as an incident to disconnecting the coupler 22 from the fitting 20, he will grasp the handles 10 and 12, and in so doing will substantially automatically force the valve 62 tightly against its seat 56, thus cutting off the supply of lubricant to the coupler and preventing the residual pressure in the conduit 14 from causing lubricant to leak from the coupler. The operator will maintain his grip upon the handles 10 and 12 while disconnecting the coupler 22 from one fitting and attaching it to the next fitting to be supplied with lubricant. The space 74 between the handles 10 and 12 is just sufficient to permit seating of the valve 62 against its seat 56 without causing the end of the handle 10 to abut against the handle 12. The handles 10 and 12 are thus normally close together, while the control valve is being grasped by the operator, and the handles 10 and 12 thus together form a convenient grip for applying force to the coupler 22 to disconnect it from one fitting and connect it to the next. The lubrication of the machine thus proceeds by successive connection of the coupler 22 to the fittings 20, the operator actuating the lubricant compressor by means of a handle 26 for each lubricating operation. During the lubricating operation, the operator may, if the fitting 20 is relatively remote from the compressor, attach the coupler 22 to the fitting and then walk over to the compressor and operate it, since the lubricant pressure acting upon the valve 62 will easily force it to open position and permit flow of lubricant to the part to be lubricated.

After all of the bearings upon a machine have been lubricated, the operator will grasp the handles 10 and 12 in a firm grip, thus closing the valve 62, disconnect the coupler 22 from the lubricant receiving fitting, and connect it to the dummy fitting 88, whereupon any residual pressure in the discharge hose 14 will cause discharge of lubricant into the reservoir 80 as soon as the operator relieves his grip upon the handles 10 and 12.

It will be noted that the relationship of the handles 10 and 12 is such that the valve 62 is closed whenever the handles are gripped in a normal natural manner. Thus an operator not familiar with the construction of the control valve will naturally operate it correctly without waste of lubricant. The operation of successively connecting the coupler 22 to the various fittings attached to the parts to be lubricated is fascilitated because the operator retains the same grip upon the control valve in disconnecting the coupler, in shifting it to the next fitting, and in connecting it to the latter. The nipple 50 is rigid so that the operator, while gripping the handles 10 and 12, may exert whatever force may be necessary to detach the coupler 22 from one fitting and attach it to the next.

While I have shown and described a preferred embodiment of my invention, it will be readily understood by those skilled in the art that variations may be made in the construction disclosed without departing from the basic features of my invention. I therefore do not wish to be limited to the precise construction disclosed, but wish to include within the scope of my invention all such modifications and variations which will readily suggest themselves.

What I claim as new and desire to secure by United States Letters Patent is:

1. A lubricating system having a manually operated pump with a lubricant discharge outlet and a conduit connected with said outlet, a coupling connected with said conduit, said coupling being adapted for successive connection with a plurality of fittings, and a normally open manually closed valve intermediate said pump and said coupling.

2. A lubricating system adapted for use with a plurality of fittings secured to a device to be lubricated, said system comprising a manually operated pump having a reservoir and a discharge outlet, a conduit connected with said outlet, a coupling connected with said conduit, said coupling being adapted for successive connection with said fittings, a normally open manually closed valve intermediate said outlet and said coupling, and a fitting on said pump discharging into the reservoir thereof, said fitting having the same dimensional construction as the fitting secured to the device to be lubricated.

3. A lubricating system adapted for use with a plurality of fittings secured to a device to be lubricated, said system comprising a manually operated pump having a lubricant reservoir and a discharge outlet, a conduit connected with said outlet, a coupling connected with said conduit, said coupling being adapted for successive connection with said fittings, a manually operated valve intermediate said outlet and said coupling, and a fitting on said pump, said fitting being of the same dimentional construction as said fittings secured to said device to be lubricated, and said fittings being arranged to discharge lubricant into said reservoir.

4. A lubricating system having a portable lubricant reservoir and a manually operated pump connected therewith, a conduit connected to the discharge outlet of the pump, a self-opening manually closed valve assembly connected to the end of said conduit for controlling the flow of lubricant therefrom, a coupler for making a lubricant-tight connection with a lubricant receiving fitting, and a relatively rigid conduit connecting said coupler to said valve assembly, whereby said coupler may be manipulated to connect it with a fitting and disconnect it therefrom by using said valve assembly as a handle.

5. A lubricant flow control comprising a nozzle member having a handle, a valve casing rigid therewith, a valve closing against the flow of lubricant, and an exposed movable member for closing said valve, said movable member being so constructed and arranged with respect to said handle as to be moved to valve-closing position incidental to a normal grasp of said handle.

ERNEST W. DAVIS.